Feb. 2, 1965 M. WILHELM 3,168,395
METHOD OF PRODUCING HIGHLY PURE ANTIMONY
Filed May 21, 1962
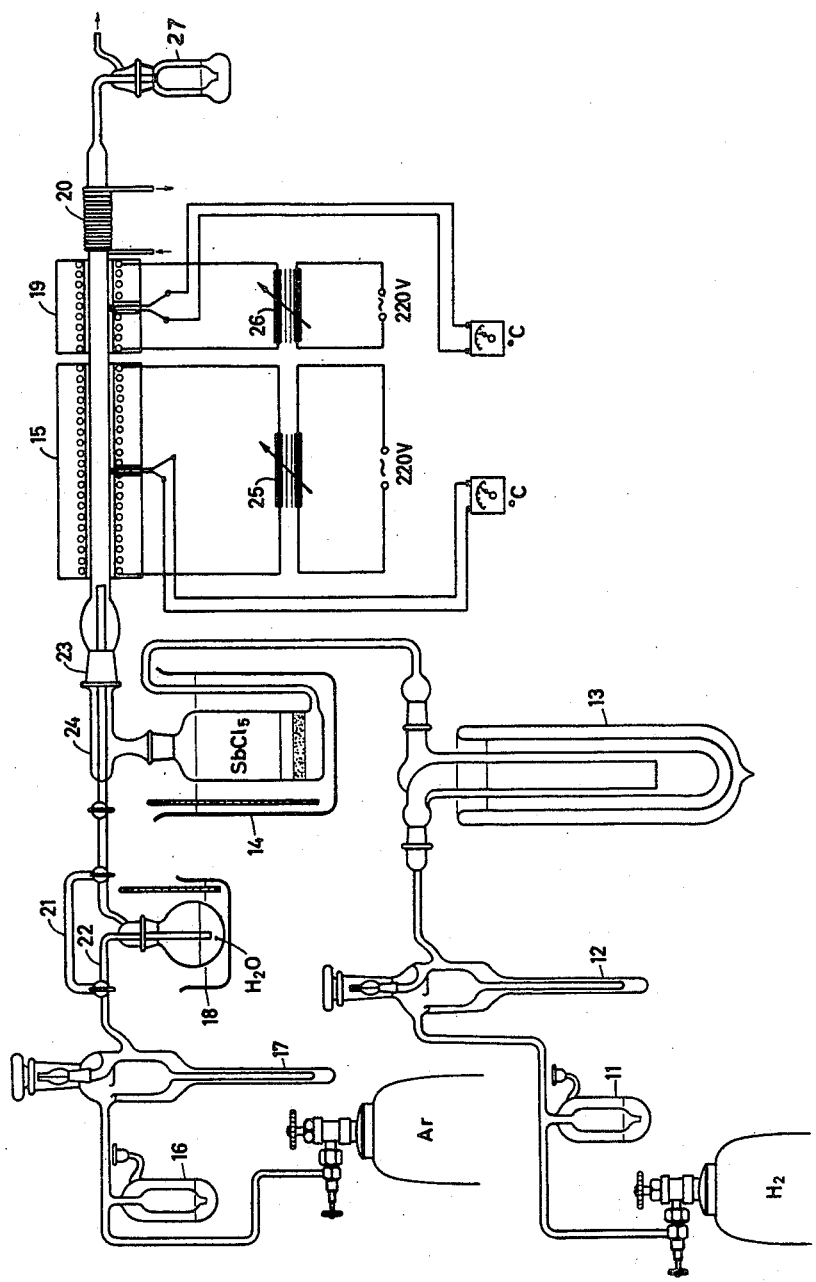

3,168,395
METHOD OF PRODUCING HIGHLY PURE ANTIMONY
Manfred Wilhelm, Nurnberg, Germany, assignor to Siemens-Schuckertwerke Aktiengesellschaft, Berlin-Siemensstadt, Germany, a corporation of Germany
Filed May 21, 1962, Ser. No. 196,343
Claims priority, application Germany, May 25, 1961,
S 74,099
1 Claim. (Cl. 75—69)

My invention relates to the production of extremely pure antimony, which is applicable for example as a constituent substance in electronic semiconductor materials or as a component of alloys that are to form part of electronic semiconductor devices.

It is known that when vapors of antimony pentachloride are passed over molten magnesium, elemental antimony, in the form of shiny globules and crystals evolves, with the emission of light flashes. It is also known that antimonic chloride (antimony pentachloride) can be reduced to metallic antimony with the air of finely distributed potassium in boiling toluol (commercial grade toluene) and that when a mixture of $SbCl_5$ vapor and chlorine is burned in hydrogen, a gray-black powder, consisting of 93% of antimony and 7% of $SbCl_3$, is obtained. Under conditions of an electrode-less electric discharge, small quantities of antimony metal can also be obtained from $SbCl_5$ and $H_2$.

It is further known that in the production of relatively large quantities of highly pure antimony as are required, for example, for semiconductor materials and devices, the antimonic chloride evolving in the course of the chemical purification, after being subjected to hydrolysis to form antimony pentoxyhydrate can be converted to tetroxide by glowing, and the latter can subsequently be reduced, in a hydrogen current, to metallic antimony. Radio-chemical analyses indicate that in the course of the three-mentioned method steps, namely, hydrolysis, glowing and reducing, the amount of metallic impurities is not appreciably diminished.

It is an object of my invention to provide a method for the production of extremely pure antimony from antimonic chloride which has been carefully purified by repeated vacuum fractionation. A more specific object of the invention is to greatly increase the yield of antimony per unit time. Another object is to reduce the power requirements for obtaining the desired antimony metal of extreme purity.

According to my invention, antimonic chloride, which is vapor heated to a temperature of about 100° C., passes together with dry hydrogen into a reduction zone heated to a temperature of about 700 to about 900° C., and thereafter the metallic antimony is precipitated in crystalline form at a lower temperature, for example, 400 to 500° C.

According to another feature of my invention, the yield of metallic antimony per unit time is greatly increased by simultaneously adding water vapor to the above-mentioned mixture of antimonic chloride vapor and hydrogen. The added water vapor has the effect of causing the reduction of antimony pentachloride $SbCl_5$ to take place, in the sense of a homogeneous catalysis, with rapidly occurring partial reactions, for example the formation and reduction of oxychloride or oxyhydrates or oxides. A purified inert gas, for example argon, laden with water vapor at a temperature of 60° to 80° C. preferably serves as transporting agent for carrying the steam into the reduction zone. The inert gas is charged with steam at a temperature of 60° to 80° C. and is employed, for example in quantities necessary for the formation of antimony pentoxide. The antimony pentachloride is hydrolyzed in the presence of this water vapor and the thus resulting antimony pentoxide is reduced to antimony while avoiding wet-chemical reactions.

By reaction of gaseous antimonic chloride, which has been repeatedly fractionated, with hydrogen in the presence of for example quantities of water vapor necessary for the formation of antimony pentoxide according to the invention, an additional considerable removal in foreign elements is achieved, particularly a reduction in the quantity of magnesium, calcium and silicon impurities. The amount of water required for the method according to the invention is rather small. For example, for converting 598 g. antimony pentachloride to antimony pentoxide (antimonic oxide) at most an amount of 90 g. water is consumed. The heretofore known wet-chemical purifying method required approximately 6000 g. of quadruply distilled water for hydrolysis of the same quantity of antimony pentachloride.

A method according to the invention affords an increase in yield of highly pure antimony of approximately 50% to give a total yield of approximately 70% based on the raw antimony used as starting material. The invention, furthermore, eliminates all processing steps which place antimony or antimonic oxide into contact with crucible material such as aluminum oxide. The three-method stages: hydrolysis, partial reduction of antimony pentoxyhydrate and reduction of antimony tetroxide, in the method according to the invention are performed as a single operation. In this manner, I achieve a considerable simplification in comparison with the purifying methods heretofore available.

The invention will be further elucidated with reference to the drawing and the following description of an example.

The drawing shows schematically an apparatus for performing the method according to the invention.

Purified hydrogen is supplied through a pressure limit valve 11 and a flow meter 12 to a trap 13 cooled with liquid nitrogen. The hydrogen, freed from traces of moisture in trap 13 bubbles through the $SbCl_5$ kept in a gas washing flask 14 at 100° C. and then enters into the reaction zone at 15, this zone being kept at about 800° C. The length of the reduction furnace 15 is about 30 cm. In addition to the above, purified argon or purified nitrogen is supplied through a valve 16 and a flow-quantity meter 17 and is charged in a flask 18 with water vapor and is thereafter also passed into the reduction furnace 15. The bath temperature for the flask 18 is approximately between 60° and 80° C. Only after the addition of moist argon to the mixture of $H_2$ and $SbCl_5$ vapor, does a rapid reduction to metallic antimony take place. This requires the intermediate formation of antimony - oxygen - compounds due to hydrolysis. The precipitation of antimony takes place within the heater furnace 19 whose length is about 13 cm. and whose temperature is kept between 400° and 500° C. The furnaces 15 and 19 are connected with an alternating-voltage source of 200 v. through control transformers 25 and 26, respectively. The exhaust gases are cooled by coil 20 prior to passing through washing flask 27 and thence from the system.

After introducing 100 ml. pentachloride in gas washing flask 14, the entire apparatus is then rinsed with dry argon or nitrogen, which passes through the connection 21 bypassing flask 18. Thereafter a hydrogen current of 30 to 40 liters per hours is passed through flask 14 and a current of argon or nitrogen, for example of 4 to 8 liters per hour, is adjusted to flow through the connection 22. The heating paths as well as the reduction furnaces and precipitators are brought to the above-mentioned temperatures. When performing the method of the invention, particular attention is to be given to a good heat insulation of the connecting piece between the water flask 18 and the reduction pipe 23. The temperature of the knee-shaped transfer piece 24 is to be kept at 100° C. by means of a heating jacket or by hot air. Only when these conditions are substantially satisfied is a high yield Sb metal reliably secured.

In a period of one hour the above-described method permits entraining about 9 g. $SbCl_5$ which are reduced to antimony metal with an approximate yield of 85 to 90%. Increasing the $SbCl_5$ temperautre in the gas washing flask 14 from 100° to 110°–120° C., as well as a further increase in the $H_2$ flowing speed, greatly promotes the dissociation of $SbCl_5$ into $SbCl_3$ and $Cl_2$. It is therefore particularly advantageous, for increasing the Sb yield, to increase the surface of the evaporating pentachloride, for example by providing a plurality of gas washing flasks or by employing a plurality of round bottom vessels in lieu thereof.

I claim:

The method of producing highly pure antimony from antimony pentachloride, which comprises maintaining antimony pentachloride at a temperautre between about 100° to 120° C., bubbling dry hydrogen through the heated antimony pentachloride to produce a reaction mixture, maintaining, reduction zone at a temperature from about 700° to 900° C., passing said reaction mixture into said reduction zone, mixing purified inert gas, at a temperature of 60° to 80° C., charged with an effective quantity of water vapor, with said reaction mixture as it enters said reduction zone to produce intermediate antimony-oxygen compounds, maintaining a precipitation zone at a temperature from about 400° to 500° C., and passing said intermediate compounds into said precipitation zone to precipitate antimony crystals from said intermediate compounds.

References Cited by the Examiner
UNITED STATES PATENTS

| | | | |
|---|---|---|---|
| 2,935,399 | 5/60 | Campbell et al. | 75—84 |
| 3,043,679 | 7/62 | Campbell et al. | 75—84 X |

WINSTON A. DOUGLAS, *Primary Examiner.*

MARCUS U. LYONS, *Examiner.*